No. 851,726.  
PATENTED APR. 30, 1907.  
F. B. ADAM.  
SERVICE ENTRANCE BOX.  
APPLICATION FILED JUNE 25, 1906.
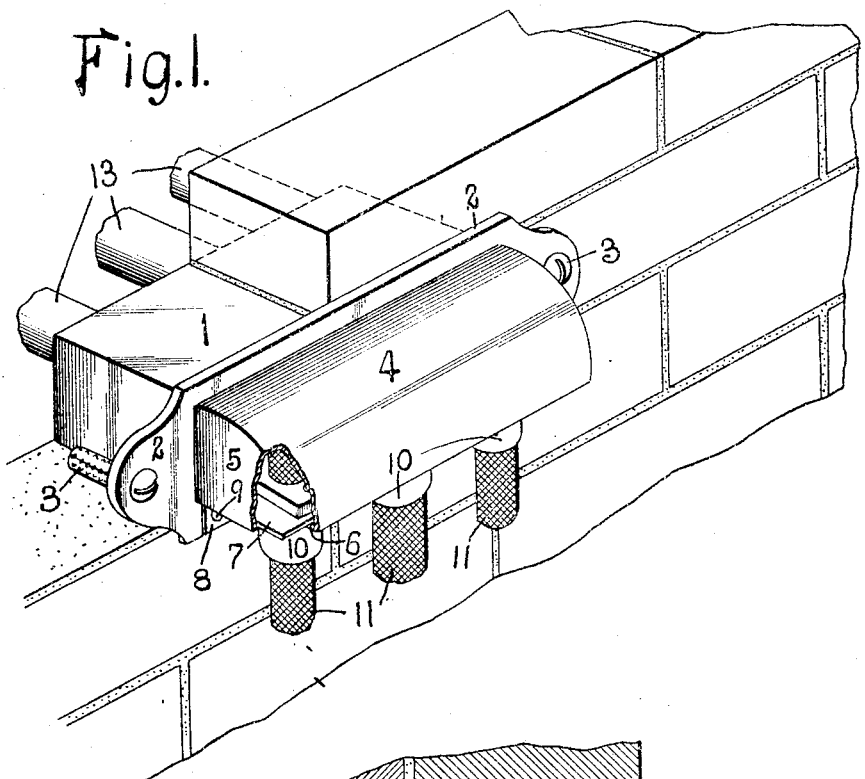
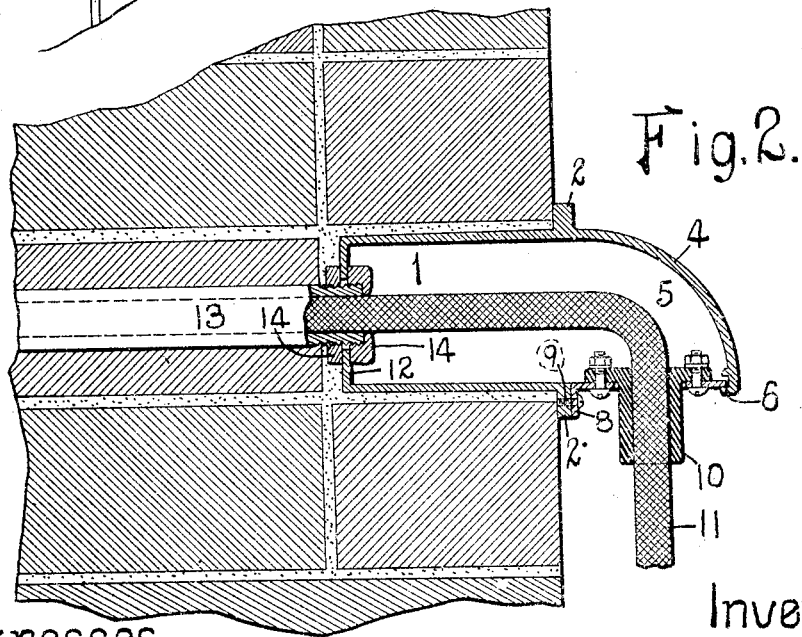
Witnesses  
A. J. McCauley  
Nels L. Church
Inventor:  
Fred B. Adam  
by Bakewell & Cornwall  
Att'y's.

UNITED STATES PATENT OFFICE.

FREDERICK B. ADAM, OF ST. LOUIS, MISSOURI, ASSIGNOR TO FRANK ADAM ELECTRIC COMPANY, OF ST. LOUIS, MISSOURI, A CORPORATION OF MISSOURI.

SERVICE ENTRANCE-BOX.

No. 851,726.     Specification of Letters Patent.     Patented April 30, 1907.

Application filed June 25, 1906. Serial No. 323,277.

*To all whom it may concern:*

Be it known that I, FREDERICK B. ADAM, a citizen of the United States, residing at St. Louis, Missouri, have invented a certain new and useful Improvement in Service Entrance-Boxes, of which the following is a full, clear, and exact description, such as will enable others skilled in the art to which it appertains to make and use the same, reference being had to the accompanying drawings, forming part of this specification, in which—

Figure 1 is a perspective view showing a service entrance box embodying the features of my invention in operative position in the wall of a building; and Fig. 2 is a cross sectional view through said box and the wall in which it is located.

This invention relates to devices which are employed for leading wires into buildings, and the object of my invention is to provide a "service entrance" box of novel form and appearance for protecting wires which enter a building.

The device herein shown, which represents the preferred form of my invention, is so constructed that it can be set into the wall of a building by simply removing one or more of the face bricks of the wall, and said device is provided with an overhanging portion which protects the wires or cables at the point where they are bent to enter the building and also presents an ornamental appearance.

Referring to the drawings which represent the preferred form of my invention, 1 designates a hollow rectangular casting of box-shape which may be of the same size as an ordinary building brick. Said box is provided with a flange 2 that engages the outer face of the wall of the building when said device is in position, and fastening devices 3, preferably expansion bolts, extend through said flange into holes which are bored in the wall of the building. A downwardly curved overhanging portion 4 is arranged at the front of the box and is formed integral therewith, said overhanging portion having side walls 5 and being also provided at its lower edge with an inwardly extending flange 6. A plate 7 rests on said flange 6 and forms a closure or a bottom for the overhanging portion, and the inner edge of said plate is provided with a flange 8 which is connected to the flange 2 of the box by bolts 9. Porcelain insulators 10 are connected to the plate 7 and project downwardly through openings therein, as shown in the drawings, and said insulators receive the wires or cables 11 which enter the building, the number of insulators with which the plate is provided depending on the number of wires or cables it is desired to run into the building at this point.

The rear wall 12 of the box is provided with openings into which conduits 13 project, said conduits extending through the other bricks of the wall of the building, as shown in Fig. 2, and being connected to the rear wall of the box by lock nuts 14. It is obvious, however, that porcelain tubes could be used instead of said conduits.

A service entrance box constructed in this manner not only absolutely protects the bend in the wires or cables from the weather but presents an ornamental appearance, and can be put in place with very little trouble, it being necessary to simply remove one or more of the face bricks of the wall of the building and insert the box in the opening left by the removal of the bricks and then secure it in position by the bolts 3.

Having thus described my invention, what I claim as new and desire to secure by Letters Patent is:

1. A service entrance box consisting of a hollow rectangular member which is adapted to be inserted in the wall of a building and which has its inner end closed, a hollow projecting portion which extends beyond the wall of the building, and insulators carried by said projecting portion and by the wall which forms the inner end of said member; substantially as described.

2. A service entrance box consisting of a hollow member having its inner end closed and being adapted to be inserted in the wall of a building, an overhanging portion formed integral with said member, a removable insulator carrying plate forming the bottom of said overhanging portion and a removable fastening device for retaining said plate in position; substantially as described.

3. A service entrance box consisting of a hollow rectangular member adapted to be inserted in a wall and provided with a laterally extending flange which engages the outer face of the wall, a downwardly curved overhanging portion formed integral with said member, and a removable insulator carrying plate forming the bottom of said overhanging portion; substantially as described.

4. A service entrance box consisting of a hollow rectangular shape casting provided with a flange which is adapted to engage the outer face of the wall of a building, a hollow projecting portion formed integral with said member and having its top wall curved downwardly, an inwardly extending flange at the lower edge of said wall, an insulator carrying plate resting on said flange and provided with a flange which is secured to the flange on said hollow casting, and an insulator projecting through the rear wall of said hollow casting; substantially as described.

In testimony whereof, I hereunto affix my signature, in the presence of two witnesses, this eighteenth day of June 1906.

FRED. B. ADAM.

Witnesses:
WELLS L. CHURCH,
GEORGE BAKEWELL.